B. Martin. Pocket Grain Tester.
73356
PATENTED
JAN 14 1868
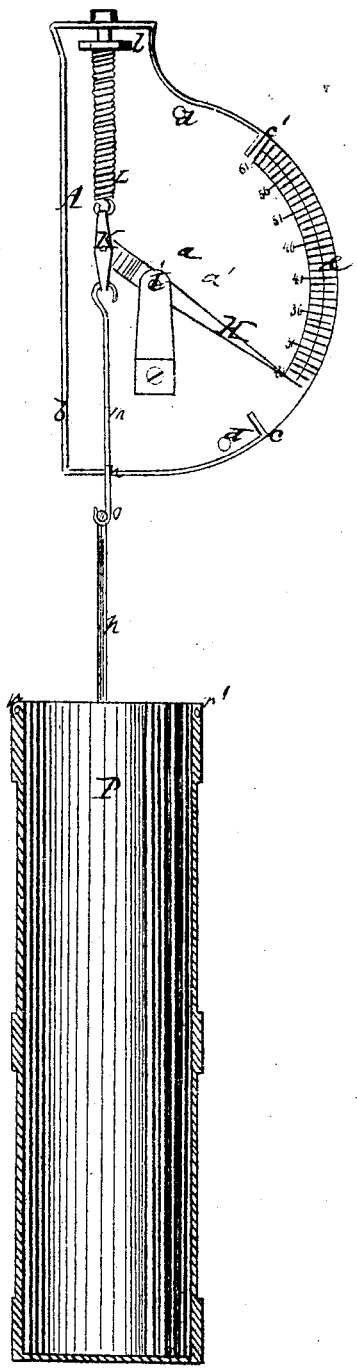

United States Patent Office.

B. MARTIN, OF PRAIRIE DU CHIEN, WISCONSIN.

Letters Patent No. 73,356, dated January 14, 1868.

POCKET GRAIN-TESTER.

*The Schedule referred to in these Letters Patent and making part of the same.*

TO ALL WHOM IT MAY CONCERN:

Be it known that I, B. MARTIN, of Prairie Du Chien, in the county of Crawford, and State of Wisconsin, have invented a new and improved Pocket Grain-Tester; and I do hereby declare the following to be a full, clear, and exact description of the same, reference being had to the accompanying drawings, forming part of this specification, and in which—

Figure 1 represents a sectional elevation of my invention when adjusted ready for use.

The object of my invention is to obtain a neat and light instrument, by which the relative weight of grain, as compared with its bulk, may be readily ascertained, and which can be made so small as to be conveniently carried in the pocket.

The frame or case of my instrument, A, is made in two pieces, $a$, a wide, flat plate in shape, nearly semicircular, and having a raised rim, $b$, running from $c$ to $c'$ and $a'$, a cover neatly fitting upon said rim $b$, to which is fastened by screws $d\ d$. Between $c$ and $c'$, the rim, and the cover which fits upon it, do not follow the periphery of the semicircular plate $a$, as at other points, but recede about a quarter of an inch, and then extend in an arc concentric with the periphery of the plate $a$, as shown in the drawing. Between these points $c$ and $c'$ the rim does not come down to the plate $a$, but leaves it, and the plate $a$, a narrow elongated slot, $e$. Between the points $c$ and $c'$ the outer edge of the plate $a$ is marked off as a graduated scale, and numbered from sixty-one downwards to twenty-six. H is an index-arm, pivoted at $i$, the centre of the circle of which the graduated scale is an arc. One end of it sweeps the graduated scale between $c$ and $c'$, and the other is attached to a link, $k$. L is a spiral spring, fixed to the upper end of the case at a point on the raised rim shown at $l$, its lower end supporting the link $k$. To the lower extremity of the link $k$ is attached a rod, $m$, which extends down through a hole in the lower part of the rim of the case at $n$, and terminates in a hook, $o$. P is a small bucket, having a bail, $p$, which may be hung upon the hook $o$ when the grain is to be tested.

Its capacity is designed to be thirty-four half ounces of wheat, weighing sixty pounds to the bushel, but any other proportion between the size of the bucket and the length of the graduated scale may be employed, it being only necessary that the number of degrees, from sixty-one downwards, should equal the capacity of the bucket in half ounces of the above-described wheat. The index should always rest, when not in use, at a point as many degrees below sixty as there are half ounces in the capacity of the bucket. One edge of the case, from $r$ to $r'$, is made perfectly straight, and is sufficiently long to be used as a strike to level the grain in the bucket, P.

To use this instrument it is only necessary to fill the bucket P, level it off with the straight edge $r\ r'$, and hang it upon the hook $o$. Its weight will cause the index-finger H to indicate on the scale $c\ c'$ the quality of the wheat in the bucket.

Having thus described my invention, what I claim as new, and desire to secure by Letters Patent, is—

1. The grain-tester, with the scale $c\ c'$ graduated from sixty-one degrees downward, as described, and with a straight edge, $r\ r'$, upon one side, for the purpose of levelling the grain in the bucket P, as herein shown and described.

2. The combination of the spring L, rod $m$, and bucket P, with the index-finger H and scale $c\ c'$, as herein described, and for the purpose specified.

To the above specification I have signed my hand, this twentieth day of April, 1867.

B. MARTIN.

Witnesses:
  JOHN JACKSON,
  J. A. NEWTON.